May 6, 1969

F. M. PELTESON 3,442,140

DRIFT RATE COMPENSATION FOR ACCELERATION
SENSITIVITY OF AN INERTIAL
NAVIGATION PLATFORM

Filed Dec. 24, 1964

Sheet __1__ of 2

SHAFT ANGLE $\theta$ $E_3 = E_1 \cos \theta + E_2 \sin \theta$ $E_4 = -E_1 \sin \theta + E_2 \cos \theta$

INVENTOR.
FRANK M. PELTESON
BY
ATTORNEY

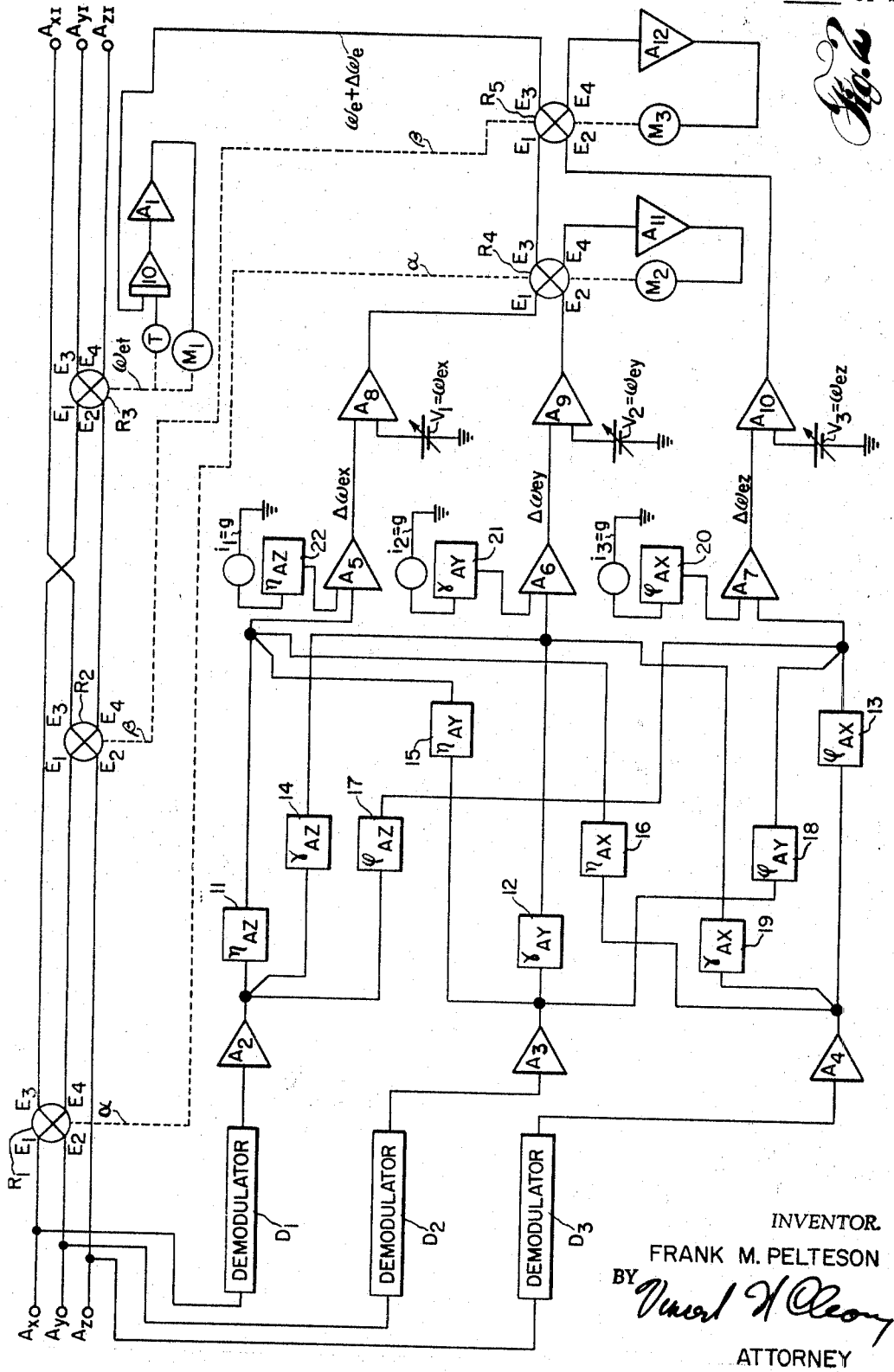

United States Patent Office 3,442,140
Patented May 6, 1969

3,442,140
DRIFT RATE COMPENSATION FOR ACCELERATION SENSITIVITY OF AN INERTIAL NAVIGATION PLATFORM
Frank M. Pelteson, Santa Ana, Calif., assignor to North American Rockwell Corporation
Filed Dec. 24, 1964, Ser. No. 421,049
Int. Cl. G01p 9/00; G01c 21/00; G06f 15/50
U.S. Cl. 73—504
5 Claims

ABSTRACT OF THE DISCLOSURE

A system for perturbing the direction cosines of a drift controlled rotating platform in accordance with the variance of the drift rate of the platform-mounted gyroscopes under the influence of acceleration. The mean drift rate of the gyroscopes is determined, the perturbing drift rate which varies as a function of the accelerations on the gyroscopes and the platforms is determined, and the perturbed direction cosines are determined utilizing the mean drift rate and perturbing drift rate.

---

This invention pertains to a means and method for altering or perturbing the direction cosine computation of an inertial navigator in accordance with the variability of the drift rate of the platform-mounted inertial angular reference devices under the influence of acceleration.

A platform or frame, useable for inertial navigation, which is controlled in response to the drift of inertial reference devices (for example, gyroscopes or vibrating strings) rotates, ideally, at a fixed angular velocity relative to the stars and relative to a set of coordinates which is fixed to the platform. The angular velocity of the platform is fixed as long as the drift of the inertial reference devices about their output axes does not change.

Accelerometers are affixed to the platform with their sensitive axis in the directions of three Cartesian coordinate axes which are fixed in the platform. It is within the contemplation of this invention that single axes, two axes or three axes accelerometers could be used. The means and method of this invention are described assuming that three separate single axis accelerometers are positioned upon the rotating platform with the sensitive axis of each accelerometer directed along a different axis of the Cartesian coordinate system defined in the platform.

In order to navigate inertially with the use of accelerometers that are mounted on a stabilized gyro platform whose gyroscopes are not torqued, it is necessary to keep track of the platform's coordinate attitude relative to an inertial coordinate frame by means of computed, time-varying direction cosines. These direction cosines will resolve the accelerometer outputs into inertial coordinates, to facilitate inertial navigation.

A method for determining the required direction cosines is described and claimed in co-pending application, Ser. No. 417,905 entitled, "A Method for Transforming the Acceleration Signals Generated by Accelerometers in a First Co-ordinate System Into Acceleration Signals in a Second Co-ordinate System," filed Dec. 12, 1964, which is assigned to the same assignee as the present application.

The time-function of these direction cosines is based on an a priori estimate of platform angular motion as dictated by a prior calibration of the gyroscopes. Such gyroscope calibrations consist generally only of the determination of the mean drift rate of the gyroscope, and do not take into account the variation from the mean drift rate due to the gyroscope's sensitivity to a varying force or acceleration.

A means and method for determining the mean drift rate of platform-mounted gyroscopes or inertial angular reference devices is described in U.S. Patent No. 3,127,774, entitled, "Means and Method for Determining the Direction of the Axis of Rotation of a Controllably Rotating Platform," issued Apr. 7, 1964.

An example of a varying force is the exposure of the platform to the gravity force while stationary and freely precessing, effectively varying the direction of gravity relative to the platform; the untorqued platform experiences this for any terrestrial navigation application.

Other laboratory experiments on the gyroscopes can provide information on the variability of the gyroscope drift rate with force or acceleration, both in direction and in magnitude. The result of such experiments is what is known as a gyroscope "Error Model."

The direction cosine computation of the inertial navigation computer will only describe the mean motion of the platform, in general. It is the purpose of this invention to demonstrate means and methods for altering, or perturbing this computed mean motion in accordance with the variability of the drift rate of the platform-mounted gyroscopes under the influence of acceleration. As a result, a more accurate computed description of platform motion will result, with an attendant increase in inertial navigation accuracy.

It is, therefore, an object of this invention to provide a method of perturbing the direction cosines of an inertial navigation platform in accordance with the variability of drift rate as a function of acceleration.

It is a further object of this invention to provide means for perturbing the direction cosines in accordance with the variability of drift rate as a function of acceleration.

It is still a further object of this invention to provide a method for determining the drift rate corrections to be applied to an inertial navigation system to compensate for instrument acceleration sensitivity.

It is yet a further object of this invention to provide a means for determining the acceleration sensitivity of angular reference devices.

It is a more particular object of this invention to provide a method for utilizing the acceleration sensitivity of angular reference devices.

These and other objects will become more apparent from the following description taken in connection with the accompanying drawings, in which:

FIG. 2 is a schematic diagram of an analog computation network used to perturb the direction cosines and compensate for changes in drift rate.

Figure 1:
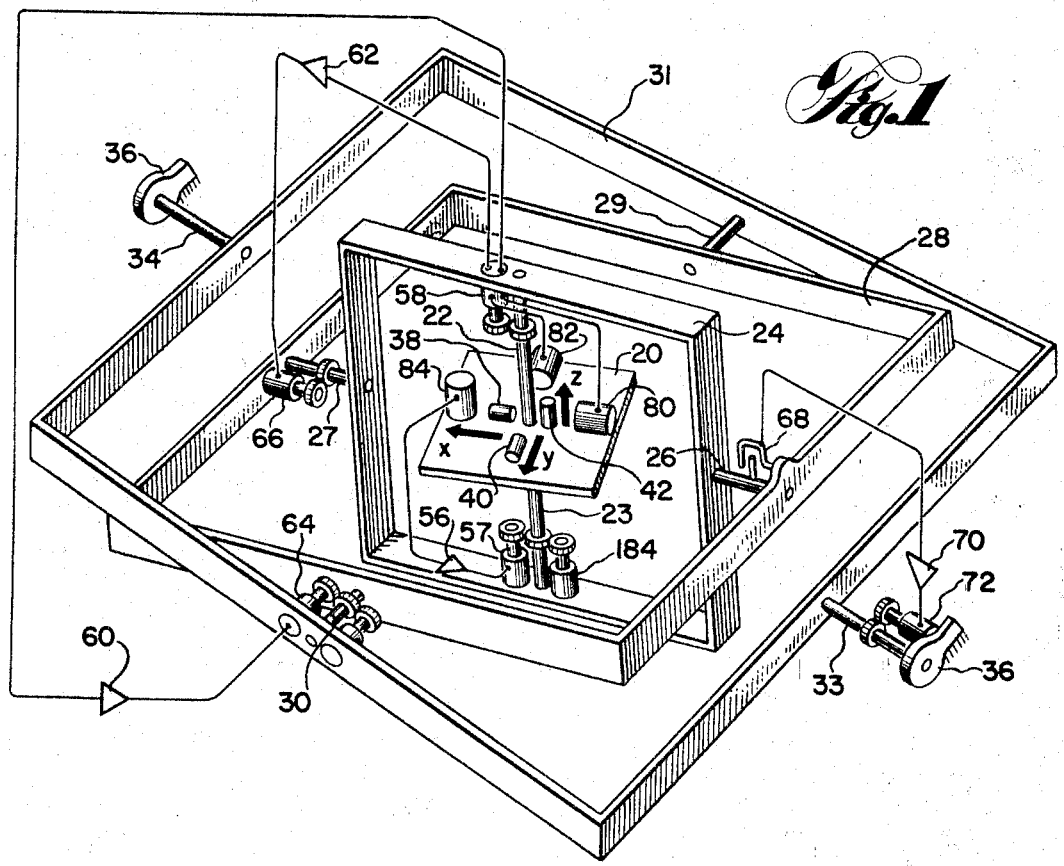
FIG. 1 is a schematic representation of a rotatable platform, the drift of which is compensated for by this invention.

In FIG. 1 a rotatable gimbaled platform 20 is supported for rotation about a first axis, denoted the Z axis, upon coaxial shafts 22 and 23. Shafts 22 and 23 are mounted for rotation relative to gimbal 24 upon bearings (not shown). Gimbal 24 is mounted for rotation, relative to gimbal 28, upon coaxial shafts 26 and 27 whose common axis is perpendicular to the axis of shafts 22 and 23. Gimbal 28 is mounted for rotation, relative to gimbal 31 upon coaxial shafts 29 and 30, whose common axis is perpendicular to the axis of shafts 26 and 27. Gimbal 31 is mounted for rotation relative to a supporting vehicle 36, upon coaxial shafts 33 and 34 whose common axis is perpendicular to the axis of shafts 29 and 30.

Three single axis accelerometers 38, 40 and 42 are affixed to platform 20 with their sensitive axes forming an orthogonal set of coordinates. The set of coordinates defined by the sensing axes of accelerometers 38, 40 and 42 are called the platform coordinates and are designated herein as X, Y, and Z, respectively. Alternatively, two two-axes accelerometers could replace the three single axis accelerometers.

Three single axis inertial angular error sensors 80, 82 and 84, such as single degree of freedom gyroscopes or vibrating strings, are positioned upon platform 20 to sense platform angular rotation error about the X, Y and Z axes, respectively. The Z axis output of inertial angular reference means 84 is connected through amplifier 56 to motor 57 to drive platform 20 relative to gimbal 24 in a direction to return to zero the Z axis output signal of angular reference means 84. The X and Y axes outputs of inertial angular reference means 80 and 82 are connected through resolver 58 and amplifiers 60 and 62 to motors 64 and 66 to drive gimbals 28 and 24 in directions to return to zero the output signals of inertial reference means 80 and 82. Pickoff means 68 is connected through amplifier 70 to motor 72 to drive gimbal 31 relative to the supporting means 36 in a direction to return to zero the output signal of pickoff means 68.

A typical vibrating string device that may be used with this invention is disclosed in copending patent application Ser. No. 96,611, entitled, "Stable Reference Apparatus," filed by William D. Mullins, Jr., and William H. Quick on Mar. 17, 1961, assigned to North American Aviation, Inc., the assignee of this invention, now Patent No. 3,198,019.

Alternatively, two two-axes angular error sensors could be used to replace elements 80, 82 and 84. The two-axes sensors may be two-axes gryroscopes, such as the type disclosed in copending U.S. patent application Ser. No. 641,720, filed Feb. 21, 1957, entitled, "Free Rotor Gyroscope," by Duncan et al. and assigned to North American Aviation, Inc., the assignee of this invention, now Patent No. 3,251,233. Use of the two-axes gyroscopes involves the caging or sensing of the additional or redundant sensing axis to one of the gyroscopes to the sensing axis of the other gyroscope. This operation is necessitated by the fact that most stable platforms are stabilized about three axes rather than four. And when two two-axes gyroscopes are used there would exist a total of four sensing axes, unless one was redundant.

In FIG. 2 is illustrated a direction cosine computer consisting of resolvers $R_1$, $R_2$, and $R_3$, motor $M_1$, servo amplifier $A_1$, tachometer $T$, and integrating amplifier 10.

The direction cosine computer is described here only to indicate its function in the overall scheme. Typically it describes the nine direction cosines of the three stabilized platform axes relative to an inertial set of axes as the matrix product of three nine-element orthogonal transformation matrices. Each of the three transformation matrices contains only one independent variable, known in the literature as an Euler angle. By judicious choice of the Euler angles, it is possible to cause one of the Euler angles to represent angular motion of the platform about its axis of rotation. Hence, the other two Euler angle matrices do not vary with time and represent, along the first row of their matrix product, the three direction cosines of the axis of rotation relatively to the three stabilized platform axes. The reason that the other two Euler angles do not vary with time is that the mean motion of the platform is considered to be constant and hence its axis of rotation is fixed in direction. For the same reason, the third Euler angle is considered to increase linearly with time, i.e., its time rate of change is constant. For convenience, the Euler angles are labeled in the following order:

Angle $\alpha$ equals the angle about the platform $z$ axis;
Angle $\beta$ equals the angle about the $\alpha$-rotated $y$ axis;
Angle $\omega_e t$ equals the angle about the $\beta$-rotated $x$ axis.

It is to be noted here that the drife rate of the platform is conventionally described in terms of the three mean drift rate components belong to each of the three gyroscope (or their equivalents) that control the platform orientation. Thus, if these three components have been determined from calibration as $\omega_{ex}$, $\omega_{ey}$, and $\omega_{ez}$ one may determine Euler angle $\beta$ from $$\omega_{ez}/\omega_e = -\sin\beta \text{ where } -90° \leq \beta = 90°$$

Next, one determines Euler angle $\alpha$, including its quadrant from $$\frac{\omega_{ey}}{\omega_e \cos\beta} = \sin\alpha; \quad \frac{\omega_{ex}}{\omega_e \cos\beta} = \cos\alpha$$

The total transformation operation that the direction cosine computer performs may be therefore expressed by the following matrix operation:

$$\begin{bmatrix} 1 & 0 & 0 \\ 0 & \cos\omega_e t & -\sin\omega_e t \\ 0 & \sin\omega_e t & \cos\omega_e t \end{bmatrix} \cdot \begin{bmatrix} \cos\beta & 0 & -\sin\beta \\ 0 & 1 & 0 \\ \sin\beta & 0 & \cos\beta \end{bmatrix} \cdot$$
$$\begin{bmatrix} \cos\alpha & \sin\alpha & 0 \\ -\sin\alpha & \cos\alpha & 0 \\ 0 & 0 & 1 \end{bmatrix}$$

or, in abbreviated matrix notation, by $$[\omega_e t]^{-1} [\beta] [\alpha]$$

The negative unit exponent on $\omega_e t$ denotes a left-hand rotation, conventionally.

Also illustrated in FIG. 2 is the angular reference devices' error model simulator consisting of demodulators $D_1$, $D_2$ and $D_3$, amplifiers $A_2$ to $A_7$, scaling resistors—elements 11 to 22 and current sources $i_1$, $i_2$, and $i_3$.

The inputs to the error model simulator are the acceleration signals $A_x$, $A_y$ and $A_z$ from accelerometers 38, 40 and 42, respectively.

For the sake of simplicity, the angular reference sensing axes shall be considered colinear with the three mutually orthogonal accelerometer sensing axes. Therefore, the three accelerometer outputs described directly the three components of force $A_x$, $A_y$ and $A_z$ that perturb the three components of mean drift rate $\omega_{ex}$, $\omega_{ey}$ and $\omega_{ez}$ contributed by the acceleration sensitivity of the three gyroscopes. Letting the perturbing drift rate quantities be called $\Delta\omega_{ex}$, $\Delta\omega_{ey}$, and $\Delta\omega_{ez}$, the error model simulator, in the most general case, would have to mechanize the following equations:

$$\Delta\omega_{ex} = \phi(A_x, A_y, A_z)$$
$$\Delta\omega_{ey} = \gamma(A_x, A_y, A_z)$$
$$\Delta\omega_{ez} = \eta(A_x, A_y, A_z)$$

This is a very difficult function to mechanize. In general no perturbation exists, if $A_x$, $A_y$, and $A_z$ are as shown in the below-stated parentheses. Therefore, one may state that $$0 = \phi(g, 0, 0)$$
$$0 = \gamma(0, g, 0)$$
$$0 = \eta(0, 0, g)$$

where $g$ is the local gravity magnitude.

Now one can more simply mechanize a three-dimensional Taylor series of the above as follows:

$$\Delta\omega_{ex} = \phi_{Ax}(A_x-g) + \phi_{Ay}A_y + \phi_{Az}A_z$$
$$+ \tfrac{1}{2}[\phi_{AxAx}(A_x-g)^2 + \phi_{AyAy}A_y^2 + \phi_{AzAz}A_z^2]$$
$$+ \phi_{AxAy}(A_x-g)A_y + \phi_{AxAx}(A_x-g)$$
$$+ \phi_{AyAz}A_yA_z$$
$$+ \cdots$$

expanded about $(g, 0, 0)$ $$\Delta\omega_{ey} = \gamma_{Ax}A_x + \gamma_{Ay}(A_y-g) + \gamma_{Az}A_z$$
$$+ \tfrac{1}{2}[\gamma_{AxAx}A_x^2 + \gamma_{AyAy}(A_y-g)^2 + \gamma_{AzAz}A_z^2]$$
$$+ [\gamma_{AxAy}A_x(A_y-g) + \gamma_{AxAz}A_xA_z$$
$$+ \gamma_{AxAy}A_x(A_y-g)]$$
$$+ \cdots$$

expanded about $(0, g, 0)$ and $$\Delta\omega_{ez} = \eta_{Ax}A_x + \eta_{Ay}A_y + \eta_{Az}(A_z-g)$$
$$+ \tfrac{1}{2}[\eta_{AxAx}A_x^2 + \eta_{AyAy}A_y^2\eta_{AzAz}(A_x-g)^2]$$
$$+ \eta_{AxAy}A_xA_y + \eta_{AxAz}A_x(A_z-g)$$
$$+ \eta_{AyAz}A_y(A_z-g)$$
$$+ \ldots$$

expanded about $(0, 0, g)$.

The $\phi_{Ai}$, $\eta_{Ai}$, $\gamma_{Ai}$, $\phi_{AiAj}$, $\eta_{AiAj}$, and $\gamma_{AiAj}$ terms in the above would have been determined in the laboratory. Their values are constant for each angular reference device. They represent, mathematically speaking, the partial derivatives of the functions $\phi$, $\eta$, and $\gamma$ at the force vector values of $(g, 0, 0)$, $(0, g, 0)$, and $(0, 0, g)$, respectively.

Also illustrated in FIG. 2 is the direction cosine computer modifier comprising amplifiers $A_8$ to $A_{12}$, variable voltage sources $V_1$, $V_2$ and $V_3$, resolvers $R_4$ and $R_5$, and motors $M_2$ and $M_3$.

In the computer modifier, the computed values of $\Delta\omega_{ex}$, $\Delta\omega_{ey}$, and $\Delta\omega_{ez}$ are added, respectively, to the values of $\omega_{ex}$, $\omega_{ey}$, and $\omega_{ez}$, forming $\omega_{ex}+\Delta\omega_{ex}$, $\omega_{ey}+\Delta\omega_{ey}$, $\omega_{ez}+\Delta\omega_{ez}$. The direction cosine computer modifier computes from these latter quantities new values of $\alpha$, $\beta$, $\omega_e$, which are then introduced into the $[\omega_e t]^{-1} [\beta] [\alpha]$ transformation matrix.

Figure 3:
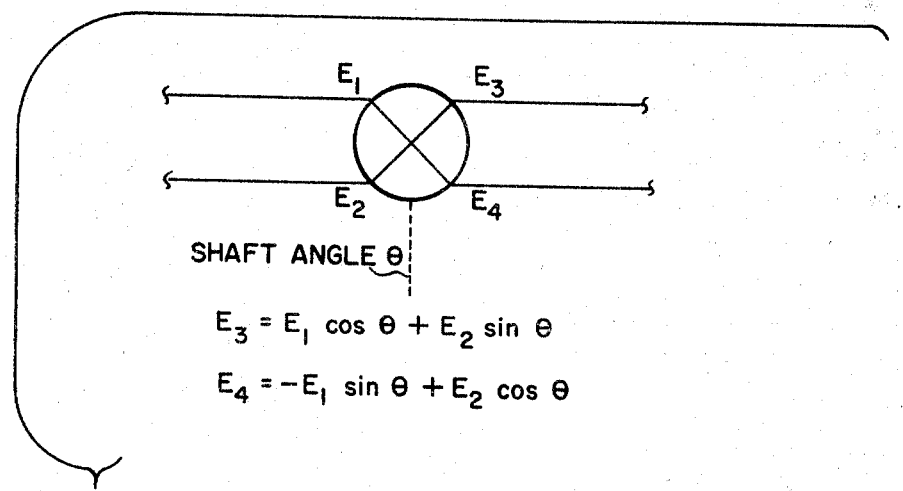
FIG. 3 is a schematic explanation of resolver schematic code.

In operation the $A_x$ and $A_y$ accelerometer outputs are first resolved by resolver $R_1$. FIG. 3 illustrates the trigonometric relationship between the terminals $E_1$ to $E_4$ for each of the resolvers of FIG. 2.

The $A_x$ output bypasses $R_1$, indicating by this that the first coordinate transformation of the three accelerometer outputs is affected by a rotation through an angle $\alpha$ about the platform Z axis. This was indicated previously by matrix $[\alpha]$. Shaft assembly $\alpha$ as indicated by the dotted line is rotated so that the rotor of the resolver $R_1$ is at an angle $\alpha$ from the electrical zero position of the resolver. The shaft assemblies are designated by the function they perform.

The second transformation is performed in similar fashion by resolver $R_2$, operating on the previously resolved outputs of resolver $R_1$ and on $A_z$. Here, the Y component of the resolved output of $R_1$ is bypassed, denoting by this rotation about the X-rotated Y axis. Hence, the operation of resolver $R_2$ denotes the mathematical process of matrix $[\beta]$. In order to conform with the schematic code of FIG. 3, the shaft assembly $\beta$ must rotate the rotor of $R_2$ by a negative angle, or $-\beta$, in order to conform with matrix $[\beta]$.

The third transformation completes the task of resolving the platform accelerometer outputs $A_x$, $A_y$, and $A_z$ into components in an inertial coordinate frame, making possible the ability to navigate in inertial space by use of accelerator information. Further resolving processes of the type described here may also be employed in order to navigate the earth-fixed coordinates or in other coordinates, such as earth-moon system fixed coordinates, or earth-sun system fixed coordinates. Such processes are beyond the scope of this invention, and are mentioned here only to demonstrate applicability. The X output from the second resolver $R_2$ bypasses the third resolver $R_3$, indicating by this a coordinate rotation about the Y-rotated X axis. Shaft assembly $\omega_e t$ rotates the rotor of $R_3$ through through angle $\omega_e t$. Hence, shaft $\omega_e t$ rotates at angular velocity $\omega_e$. This is made possible by a tachometric feedback servo loop consisting of elements T, 10, $A_1$, and $M_1$.

Servo amplifier $A_1$ energizes motor $M_1$ so that shaft $\omega_e t$ rotates at a velocity sensed by tachometer T. The output of T is differenced with input $\omega_e$ at the input of integrating amplifier 10. The input to 10 will be made to vanish, i.e., the output of tachometer T will be made to agree with input $\omega_e$. As a result the output of integrating amplifier 10 furnishes a constant input to servo amplifier $A_1$, when such agreement takes place. Because signal $\omega_e$ represents $\omega_e$, the output of tachometer T will also represent $\omega_e$. Therefore, shaft $\omega_e t$ attached to tachometer T will rotate at angular velocity $\omega_e$ as well, fulfilling the desired requirement.

In FIG. 2 there is illustrated only the simplest version of the error model simulator, i.e., the version with only the first order error coefficients. The three-dimensional Taylor's series stated in a previous section of the disclosure carries out the Taylor's series to the second order; more complex mechanization with multipliers would have to be created for the latter. It should be realized that the values of the second order partial derivatives are often significant and need to be represented, in practice. However, for simplicity of presentation the second order terms are not shown in FIG. 2.

Demodulator amplifiers $D_1$, $D_2$ and $D_3$ ensure a high source impedance in order to supply direct electrical currents proportional to $A_x$, $A_y$, and $A_z$, rather than electrical potentials proportional to the same. This is made necessary by the configuration of the resistor matrix made up of resistor elements 11 to 19 that multiplies said currents prior to summation by amplifiers $A_5$, $A_6$, and $A_7$. Note that resistors 11 through 19 are appropriately labeled with the partial derivatives determined in the laboratory, i.e., with the error coefficients of the laboratory error model of the particular angular reference device in use. Hence, current flowing through one of the resistors of 11 through 19 represents the product of a component of acceleration with an error coefficient. By adding the appropriate products together by means of summing amplifiers $A_5$ through $A_7$, the amplifier output currents are made proportional to $\Delta\omega_{ex}$, $\Delta\omega_{ey}$, and $\Delta\omega_{ez}$ as expressed by the previously stated Taylor's series' first order terms. Note also that the terms $\phi_{Ax}g$, $\gamma_{Ay}g$, and $\eta_{Az}g$ are simulated by resistors 20, 21 and 22 energized by constant current sources $i_1$, $i_2$ and $i_3$ representing gravity acceleration $g$. This is necessary, since the mean rate of each angular reference device is supposed to have been calibrated under the influence of $g$ while on an earth-fixed test stand, and while in the same attitude relative to the horizon. The amplifiers $A_2$, $A_3$ and $A_4$ amplify the signals from the demodulators before applying them to the resistor matrix.

The purpose of the direction cosine computer modifier is to control the angles $\alpha$ and $\beta$ and to control the angular rate $\omega_e$ by controlling the angles of shafts $\alpha$ and $\beta$, respectively, and by controlling the angular rate of shaft $\omega_e t$ as based on the signals $\Delta\omega_{ex}$, $\Delta\omega_{ey}$, $\Delta\omega_{ez}$, $\omega_{ex}$, $\omega_{ey}$, and $\omega_{ez}$.

Summing amplifiers $A_8$, $A_9$, and $A_{10}$ add the error model simulator computed values of $\Delta\omega_{ex}$, $\Delta\omega_{ey}$, $\Delta\omega_{ez}$ to the permanently generated values of teh mean drift rate $\omega_{ex}$, $\omega_{ey}$, $\omega_{ez}$ that are generated by variable voltage sources $V_1$, $V_2$ and $V_3$, respectively.

Resolver $R_4$ is connected so that output $E_4$ is caused to go to zero by means of amplifier $A_{11}$ and motor $M_2$. Motor $M_2$ drives assembly $\alpha$ and hence the rotor of resolver $R_4$ until $A_{11}$ receives a zero signal from $E_4$ of $R_4$ Noting that $E_4$ is in equilibrium when zero, one may write the equation for $E_4$ as given in FIG. 3 when $E_4$ is zero:

$$0 = -E_1 \sin\theta + E_2 \cos\theta$$

or, since $$E_1 = (\omega_{ex} + \Delta\omega_{ex})$$

and $$E_2 = (\omega_{ey} + \Delta\omega_{ey})$$

then from the above, $$\frac{(\omega_{ey} - \Delta\omega_{ev})}{\omega_{ex} + \Delta\omega_{ex}} = \tan\theta$$

which is also provable by dividing the previously stated relations $$\frac{\omega_{ey}}{\omega_e \cos\beta} = \sin\alpha, \quad \frac{\omega_{ex}}{\omega_e \cos\beta} = \cos\alpha$$

by each other while ignoring the $\Delta\omega_e$ terms.

Therefore, angle $\theta$ for resolver $R_4$ must necessarily be angle $\alpha$, demonstrating by this that the resolver servo employing $R_4$ generates angle $\alpha$; not from values $\omega_{ex}$ and $\omega_{ey}$ but from the *corrected* values of $\omega_{ex}+\Delta\omega_{ex}$, and $\omega_{ey}+\Delta\omega_{ey}$, as required. Hence, $\alpha$ will be seen to vary as the intended function of $A_x$, $A_y$, and $A_z$.

The resolver servo employing resolver $R_5$ will, in similar fashion, cause angle $-\beta$ to be generated. To demonstrate this, it is again seen that $E_4$ of $R_5$ is maintained at zero. Hence, from FIG. 3 one may write that, for $R_5$ $$0 = -E_1 \sin\theta + E_2 \cos\theta$$

Now $E_1$ of $R_5$ is $E_3$ of $R_4$, and $E_2$ of $R_5$ is $\omega_{ez}+\Delta\omega_{ez}$.

From FIG. 3, $E_3$ of $R_4$ is (dropping the $\Delta\omega_e$ terms for simplicity, temporarily)

$$E_3(R_4) = \omega_{ex} \cos\alpha + \omega_{ez} \sin\alpha$$

Since $$\omega_{ey}/\omega_{ex} = \tan\alpha$$

then $$\cos\alpha = \frac{\omega_{ex}}{\sqrt{\omega_{ex}^2+\omega_{ey}^2}}$$

and $$\sin\alpha = \frac{\omega_{ey}}{\sqrt{\omega_{ex}^2+\omega_{ey}^2}}$$

Hence, $$E_4(R_4) = \sqrt{\omega_{ex}^2+\omega_{ey}^2}$$

Thus, from the above for $E_4(R_5)$ $$0 = -\left(\sqrt{\omega_{ex}^2+\omega_{ey}^2}\right)\sin\theta + \omega_{ez}\cos\theta$$

or $$\tan\theta = \frac{\omega_{ez}}{\sqrt{\omega_{ex}^2+\omega_{ey}^2}}$$

and $$\sin\theta = \frac{\omega_{ez}}{\sqrt{\omega_{ex}^2+\omega_{ey}^2+\omega_{ez}^2}} = \frac{\omega_{ez}}{\omega_e}$$

But from the previous relations, $$\omega_{ez}/\omega_e = -\sin\beta$$

Hence, $$\theta = -\beta$$

demonstrating that shaft assembly $\beta$ servoes to angle $-\beta$. Output $E_3$ of $R_5$ will be shown to equal $\omega_e$ as follows. From FIG. 3:

$$E_3(R_5) = \sqrt{\omega_{ex}^2+\omega_{ey}^2}\cos(-\beta) + \omega_{ez}\sin(-\beta)$$

Note that $$\cos(-\beta) \sqrt{\frac{\omega_{ex}^2+\omega_{ey}^2}{\omega_e}}$$

and $$\sin(-\beta) = \frac{\omega_{ez}}{\omega_e}$$

Hence, $$E_3(R_5) = \frac{\omega_{ex}^2+\omega_{ey}^2+\omega_{ez}^2}{\omega_e} = \frac{\omega_e^2}{\omega_e} = \omega_e$$

Thus, output $E_3$ of $R_5$ is $\omega_e + \Delta\omega_e$, by reinstating the dropped $\Delta\omega_e$ terms in all the above equations. Hence, by feeding $E_3$ of resolver $R_5$ into integrating amplifier 10, shaft assembly $\omega_e t$ will be set to run at angular rate $\omega_e + \Delta\omega_e$ as a function of $A_x$, $A_y$, $A_z$.

The above method describes the desired process if an analog computation is employed. It may also be possible to employ a digital computer to compute the same compensations. In the digital case, it may be more advantageous to employ somewhat different equations, since reliance on sine-cosine resolvers is not of paramount importance here. For example, in zone (A), the digital computer may more suitably generate a set of matrices $[A]^{-1}[\omega_e t]^{-1}[A]$ instead of $[\omega_e t]^{-1}[\beta][\alpha]$. In expanded notation the former can be reduced to the following single matrix:

$$\begin{bmatrix} a_1^2 + (1 a_1^2)\cos\omega_e t & a_1 a_2[1-\cos\omega_e t] - a_3 \sin\omega_e t & a_1 a_3[1-\cos\omega_e t] + a_2 \sin\omega_e t \\ a_1 a_2[1-\cos\omega_e t] + a_3 \sin\omega_e t & a_2^2 + (1-a_2^2)\cos\omega_e t & a_2 a^3[1-\cos\omega_e t] - a_1 \sin\omega_e t \\ a_1 a_3[1-\cos\omega_e t] - a_2 \sin\omega_e t & a_2 a_3[1-\cos\omega_e t] + a_1 \sin\omega_e t & a_3^2 + (1-a_3^2)\cos\omega_e t \end{bmatrix}$$

in which $a_1$, $a_2$, and $a_3$ are the three direction cosines of the axis of rotation relative to the platform-fixed Cartesian coordinate axes. The error model simulator would be replaced by the error model equations of the type previously given. Its outputs would be the same. The direction cosine computer modifier would be replaced by the following equations:

$$\Delta\omega_e = a_1 \Delta\omega_{ex} + a_2 \Delta\omega_{ey} + a_3 \Delta\omega_{ez}$$

$$\Delta a_1 = \frac{\Delta\omega_{ex}}{\omega_e} - \frac{\Delta\omega_e a_1}{\omega_e}$$

$$\Delta a_2 = \frac{\Delta\omega_{ey}}{\omega_e} - \frac{\Delta\omega_e a_2}{\omega_e}$$

$$\Delta a_3 = \frac{\Delta\omega_{ez}}{\omega_e} - \frac{\Delta\omega_e a_3}{\omega_e}$$

Then the modifier would add $\Delta\omega_e$ to $\omega_e$, $\Delta a_1$ to $a_1$, $\Delta a_2$ to $a_2$, and $\Delta a_3$ to $a_3$ and would replace $\omega_e$, $a_1$, $a_2$, and $a_3$ with the newly-formed four sums respectively, in the above matrix.

Although the device of this invention has been particularly described above, it is not intended that the invention should be limited by the description but only in accordance with the spirit and scope of the appended claims.

I claim:

1. A method of perturbing the direction cosine matrix of a drift controlled rotating platform in accordance with the variance of the drift rate of the platform mounted gyroscopes under the influence of acceleration comprising the steps of:

determining the three mean drift rate components $\omega_{ex}$, $\omega_{ey}$, and $\omega_{ez}$ expressed in a Cartesian set of coordinates fixed relative to said platform;

determining the three perturbing drift rate quantities $\Delta\omega_{ex}$, $\Delta\omega_{ey}$, and $\Delta\omega_{ez}$ as a function of the accelerations $A_x$, $A_y$, and $A_z$ acting along each axis of said Cartesian set of coordinates;

adding the three mean drift rate components $\omega_{ex}$, $\omega_{ey}$, and $\omega_{ez}$, respectively, to the three perturbing drift rates $\Delta\omega_{ex}$, $\Delta\omega_{ey}$, and $\Delta\omega_{ez}$; and determining the perturbed direction cosine matrix by computing the matrix $$\begin{bmatrix} 1 & 0 & 0 \\ 0 & \cos\omega_e t & -\sin\omega_e t \\ 0 & \sin\omega_e t & \cos\omega_e t \end{bmatrix} \cdot \begin{bmatrix} \cos\beta & 0 & -\sin\beta \\ 0 & 1 & 0 \\ \sin\beta & 0 & \cos\beta \end{bmatrix} \begin{bmatrix} \cos\alpha & \sin\alpha & 0 \\ -\sin\alpha & \cos\alpha & 0 \\ 0 & 0 & 0 \end{bmatrix}$$

in which $$\left[\frac{\omega_{ex}}{\omega_e} = -\sin\beta, \quad \frac{\omega_{ey}}{\omega_e \cos\beta} = \sin\alpha, \quad \frac{\omega_{ex}}{\omega_e \cos\beta} = \cos\alpha\right]$$

$$\frac{\omega_{ez}+\Delta\omega_{ez}}{\omega_e} = -\sin\beta, \quad \frac{\omega_{ey}+\Delta\omega_{ey}}{\omega_e \cos\beta} = \sin\alpha, \quad \frac{\omega_{ex}+\Delta\omega_{ex}}{\omega_e \cos\beta} = \cos\alpha$$

and $t$ is the time elapsed from initial release of said platform from a preferred orientation.

2. A method of perturbing the direction cosine matrix of a drift controlled rotating platform in accordance with the variance of the drift rate of the platform mounted angular reference devices under the influence of acceleration comprising the steps of:

determining the three mean drift rate components $\omega_{ex}$, $\omega_{ey}$, and $\omega_{ez}$ of said angular reference devices expressed in a Cartersian set of coordinates;

determining the three perturbing drift rate quantities $\Delta\omega_{ex}$, $\Delta\omega_{ey}$, and $\Delta\omega_{ez}$ as a function of the accelerations of said angular reference devices;

determining the perturbed direction cosine matrix by computing the matrix $$\begin{bmatrix} 1 & 0 & 0 \\ 0 & \cos(\omega_e + \Delta\omega_e)t & -\sin(\omega_e + \Delta\omega_e)t \\ 0 & \sin(\omega_e + \Delta\omega_e)t & \cos(\omega_e + \Delta\omega_e)t \end{bmatrix} \cdot$$

$$\begin{bmatrix} \cos\beta & 0 & -\sin\beta \\ 0 & 1 & 0 \\ \sin\beta & 0 & \cos\beta \end{bmatrix} \begin{bmatrix} \cos\alpha & \sin\alpha & 0 \\ -\sin\alpha & \cos\alpha & 0 \\ 0 & 0 & 1 \end{bmatrix}$$

in which $$\frac{\omega_{ez} + \Delta\omega_e^z}{\omega_e + \Delta\omega_e} = -\sin\beta, \quad \frac{\omega_{ey} + \Delta\omega_{ey}}{(\omega_e + \Delta\omega_e)\cos\beta} = \sin\alpha, \quad \frac{\omega_{ex} + \Delta\omega_{ex}}{(\omega_e + \Delta\omega_e)\cos\beta} = \cos\alpha$$

and $t$ is the time elapsed from initial release of said platform.

3. In combination with a rotatable platform whose rotation is controlled in response to the drift of angular reference means positioned upon said platform, the mean drift rate of said angular reference means being known, and having acceleration sensing means positioned upon said platform to sense accelerations along a first predetermined set of axes, means for determining the variance in drift rate of said angular reference means as a function of sensed acceleration, means for transforming said sensed accelerations along a first predetermined set of axes into accelerations along a second predetermined set of axes, and means for controlling said transforming means as a function of the sum of said mean drift rate and said variance in drift rate of said angular reference means.

4. In combination with a rotatable platform whose rotation is controlled in response to the drift of angular reference means positioned upon said platform, the mean drift rate of said angular reference means being known, and having accelerometer means positioned upon said platform to sense acceleration in the directions of three Cartesian axes fixed on said platform, means for determining the variance in drift rate of said angular reference means as a function of acceleration, means for transforming the accelerations sensed by said accelerometer means along said Cartesian axes fixed on said platform into accelerations along three Cartesian axes fixed with respect to space, and means for controlling said transforming means as a function of the sum of said mean drift rate and said variance in drift rate of said angular reference means.

5. In combination with a rotatable platform whose rotation is controlled in response to the drift of angular reference means positioned upon said platform and having accelerometer means positioned upon said platform to measure accelerations in the directions of three Cartesian axes fixed on said platform;

an acceleration sensitive angular reference drift simulator for providing signals indicative of the change in drift of said angular reference means as a function of said measured acceleration;

means for transforming as a function of average drift said measured accelerations in the directions of said platform fixed axes into accelerations in directions along a second predetermined set of axes;

means for varying said transforming means as a function of the algebraic sum of said average drift and said change in drift.

References Cited

UNITED STATES PATENTS 3,272,972  9/1966  Yamron et al. _____ 235—150.25
3,127,774  4/1964  Fischer et al. _____ 73—504
3,231,726  1/1966  Williamson _____ 235—150
3,269,024  8/1966  Fischer et al. _____ 33—226

OTHER REFERENCES

Inertial Navigation, by Daigle from "R.C.A. Engineer," vol. 5, No. 3, pp. 40–43, November 1959.

Compensating Gyro Drifts, by Freitzburg, from "Control Engineering," pp.113–116, November 1963.

JAMES J. GILL, *Primary Examiner.*

U.S. Cl. X.R.

73—178; 235—150.25

PO-1050
(5/69)

UNITED STATES PATENT OFFICE
CERTIFICATE OF CORRECTION

Patent No. 3,442,140    Dated May 6, 1969

Inventor(s) F. M. Pelteson

It is certified that error appears in the above-identified patent and that said Letters Patent are hereby corrected as shown below:

Column 8, Claim 3, Line 41, " 0 0 0 " should read --- 0 0 1 ---.

SIGNED AND
SEALED
APR 28 1970

(SEAL)
Attest:

Edward M. Fletcher, Jr.
Attesting Officer

WILLIAM E. SCHUYLER, JR.
Commissioner of Patents